(12) United States Patent
Schneider et al.

(10) Patent No.: US 10,878,209 B2
(45) Date of Patent: Dec. 29, 2020

(54) CAMERA AND METHOD OF DETECTING IMAGE DATA

(71) Applicant: SICK AG, Waldkirch (DE)

(72) Inventors: Florian Schneider, Waldkirch (DE); Thomas Pfrengle, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 16/275,391

(22) Filed: Feb. 14, 2019

(65) Prior Publication Data
US 2019/0258837 A1   Aug. 22, 2019

(30) Foreign Application Priority Data
Feb. 16, 2018   (DE) .......................... 10 2018 103 544

(51) Int. Cl.
| | | |
|---|---|---|
| *G06K 7/10* | (2006.01) | |
| *G03B 15/03* | (2006.01) | |
| *G03B 15/06* | (2006.01) | |
| *G06K 9/20* | (2006.01) | |
| *G03B 15/02* | (2006.01) | |
| *H04N 5/225* | (2006.01) | |

(52) U.S. Cl.
CPC ......... *G06K 7/10742* (2013.01); *G03B 15/02* (2013.01); *G03B 15/03* (2013.01); *G03B 15/06* (2013.01); *G06K 9/2036* (2013.01); *H04N 5/2256* (2013.01); *G03B 2215/0582* (2013.01)

(58) Field of Classification Search
CPC ........... G06K 7/10742; G06K 7/10821; G06K 7/10831; G06K 9/2036; G03B 15/03; G03B 15/06; G03B 2215/0582; G03B 2215/0585
See application file for complete search history.

(56) References Cited

U.S. PATENT DOCUMENTS

| | | | |
|---|---|---|---|
| 5,880,861 A | * | 3/1999 | Nishida ................. G02B 5/021 359/15 |
| 6,614,596 B2 | | 9/2003 | Gladnick |
| 7,614,563 B1 | | 11/2009 | Nunnink et al. |
| 7,822,335 B1 | | 10/2010 | Pastore |
| 8,768,159 B2 | | 7/2014 | Messina et al. |
| 9,286,502 B1 | * | 3/2016 | Ashby ................. G06K 7/1465 |

(Continued)

FOREIGN PATENT DOCUMENTS

| | | |
|---|---|---|
| DE | 60303328 T2 | 7/2006 |
| DE | 112014007128 T5 | 8/2017 |

(Continued)

OTHER PUBLICATIONS

Office Action dated Jun. 12, 2018 issued in corresponding German Application No. 102018103544.6.

*Primary Examiner* — Thien M Le
*Assistant Examiner* — April A Taylor
(74) *Attorney, Agent, or Firm* — Nath, Goldberg & Meyer; Jerald L. Meyer

(57) ABSTRACT

A camera is provided that comprises an image sensor for detecting image data from a detection zone, an illumination unit having at least one light source for illuminating the detection zone, and a front screen. In this respect, a lateral deflection element is provided that is associated with the light source, that is arranged in the camera protected by the front screen, and that has a diffusely scattering surface or a reflective surface to generate a diffuse illumination or a dark field illumination in the detection zone.

16 Claims, 3 Drawing Sheets

(56) References Cited

U.S. PATENT DOCUMENTS

Figure 1:
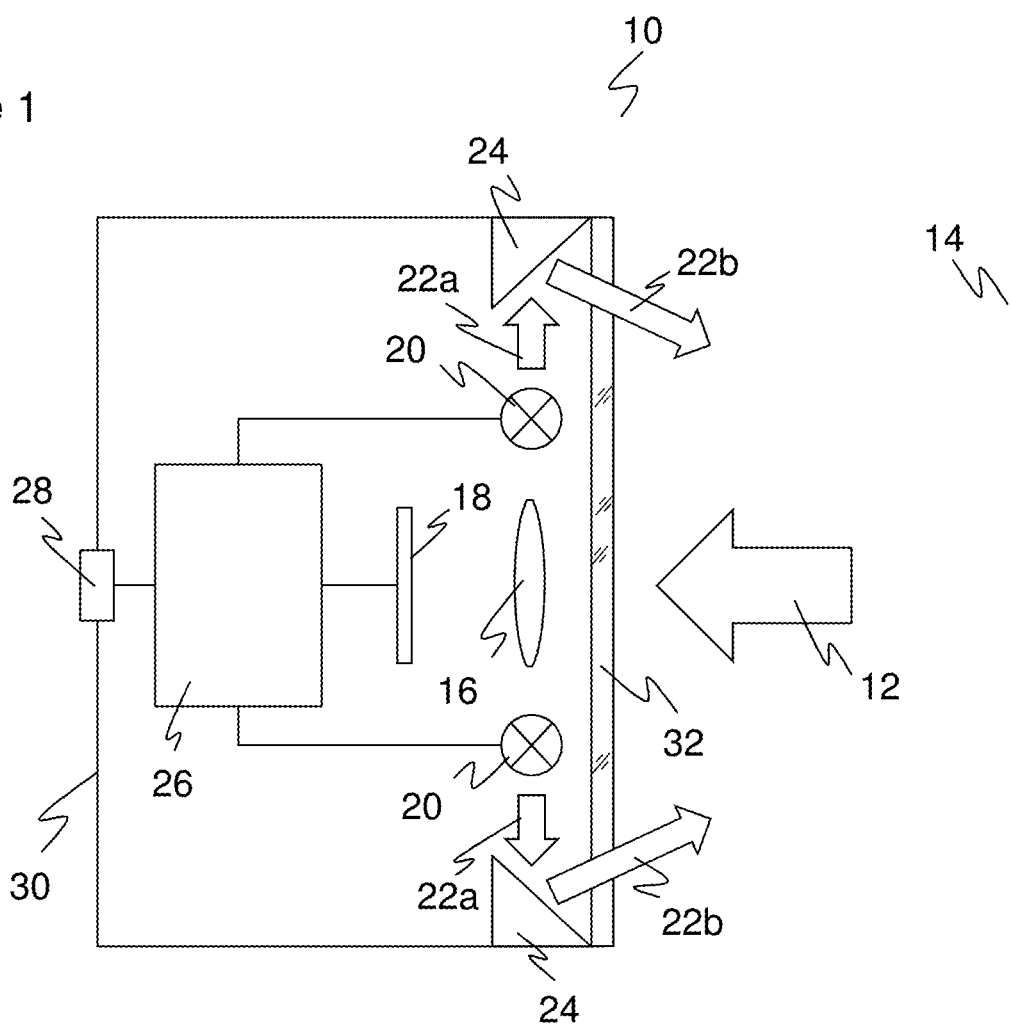

| | | | |
|---|---|---|---|
| 9,569,653 B1 | 2/2017 | Suman | |
| 2003/0231494 A1 | 12/2003 | Shimokawa et al. | |
| 2013/0128104 A1* | 5/2013 | Nunnink | G03B 15/05 348/373 |
| 2013/0261472 A1* | 10/2013 | Parkin | G06F 19/3418 600/485 |
| 2014/0209796 A1 | 1/2014 | Ishii et al. | |
| 2014/0132793 A1 | 5/2014 | Chang et al. | |
| 2015/0338498 A1* | 11/2015 | Weber | H04N 5/2354 348/169 |
| 2017/0078540 A1* | 3/2017 | Schneider | G02B 27/14 |

FOREIGN PATENT DOCUMENTS

| | | |
|---|---|---|
| EP | 1363153 A1 | 11/2003 |
| EP | 1158460 B1 | 10/2004 |
| EP | 1688861 B1 | 9/2011 |
| EP | 1687752 B2 | 4/2012 |
| JP | 200143301 A | 2/2001 |
| JP | 2003-4641 A | 1/2003 |
| JP | 2003-337365 A | 11/2003 |
| JP | 2010-61392 A | 3/2010 |
| JP | 2010-127897 A | 8/2010 |
| WO | 2004/081648 A2 | 9/2004 |

\* cited by examiner

CAMERA AND METHOD OF DETECTING IMAGE DATA

The invention relates to a camera that comprises an image sensor for detecting image data from a detection zone, an illumination unit having at least one light source for illuminating the detection zone, and a front screen. The invention further relates to a method of detecting image data from a detection, wherein the detection zone is illuminated through a front screen by an illumination unit having at least one light source.

Cameras are used in a variety of ways in industrial applications to automatically detect object properties, for example for the inspection or for the measurement of objects. In this respect, images of the object are recorded and are evaluated in accordance with the task by image processing methods. A further use of cameras is the reading of codes. Objects with the codes located thereon are recorded with the aid of an image sensor and the code regions are identified in the images and then decoded. Camera-based code readers also cope without problem with different code types than one-dimensional barcodes which also have a two-dimensional structure like a matrix code and provide more information. The automatic detection of the text of printed addresses, (optical character recognition, OCR) or of handwriting is also a reading of codes in principle. Typical areas of use of code readers are supermarket cash registers, automatic parcel identification, sorting of mail shipments, baggage handling at airports, and other logistic applications.

A frequent detection situation is the installation of the camera above a conveyor belt. The camera records images during the relative movement of the object stream on the conveyor belt and instigates further processing steps in dependence on the object properties acquired. Such processing steps comprise, for example, the further processing adapted to the specific object at a machine which acts on the conveyed objects or a change to the object stream in that specific objects are expelled from the object stream within the framework of a quality control or the object stream is sorted into a plurality of partial object streams. If the camera is a camera-based code reader, the objects are identified with reference to the affixed codes for a correct sorting or for similar processing steps.

Many industrial camera systems use their own illumination to be independent of variable light conditions. Differing illumination types are distinguished. In addition to the direct illumination that is also called bright field illumination, dark field illumination and diffuse illumination are also inter alia known. Such illuminators are conventionally both installed directly in the device and added as external illuminators.

A typical area of use for dark field illumination is detection using metal surfaces. The light is shone in at a shallow angle here. In accordance with the principle of angle of incidence equals the emergent angle, the total light is directed away from the observer or from the camera and the field therefore remains dark. Structures such as slanted edges, scratches, impressions, recesses and elevated portions interfere with the optical path of the light. The light is reflected toward the camera or is typically only scattered at these anomalies. These defect points then appear as bright in the camera image.

With a dark field illumination, the illumination light sources, optionally with the optics, have to be arranged at a specific position and angle toward the camera field of vision. The light sources are typically located on a circular arrangement at a specific angle with respect to the optical axis of the camera. For this reason, the light sources can no longer be located on a common expansion card.

Diffuse light may be useful in applications in which reflective, polished, shiny, or metallic objects have to be inspected. It is particularly difficult if these surfaces are no longer planar, but of free form, crimped, arched, or cylindrical.

In EP 1 158 460 B1, different groups of transmission elements are controlled to transmit light in a teaching process and that control and thus illumination is used for the subsequent operation at which one or more characteristic features of a detected object are optimum. The annularly arranged transmission elements can admittedly generate illumination from different directions, but not diffuse illumination or illumination at a sufficiently shallow angle for dark field illumination.

EP 1 687 752 B2 discloses a provision of an omnidirectional illumination in a scanning apparatus that reads codes with an image sensor. A respective light guide element whose light emergence surface deflects the light inwardly is respectively arranged in front of the individually controllable light sources of a dark field illumination that surround a reception optics. The light of the light sources is varied for so long until a code included in the image data can be read. The light guides require a certain depth, which is not problematic for the described application in a hand-held device, but is disadvantageous with industrial cameras.

In addition, one respective light guide is provided per light source so that the overall design becomes very complex with stronger illuminators having a large number of light sources.

EP 1 688 861 B1 uses an attachment having reflectors or light guides in front of the illumination of a code reader and the light is incident on the reading zone at a shallow angle at the other end of the attachment. This attachment makes the code reader very substantially larger, however.

A combined dark field illumination and bright field illumination is known from U.S. Pat. No. 8,768,159 B2. Inner light sources are provided that irradiate directly into the detection zone and thus represent the bright field illumination and outer light sources are provided having a light guide with a slanted emergence surface for the dark field illumination. The dark field illumination is thus a further solution using light guides which brings along the disadvantages already mentioned multiple times with respect to complexity and construction size.

U.S. Pat. No. 9,569,653 B1 describes a dark field illumination in a slanted plane for a code reader. Respective separate light sources are provided for diffuse illumination, for which purpose the light transmits a diffuser and the dark field illumination is provided by means of reflectors. The front of the code reader is slanted by 15°-30° and should be brought into alignment with the surface of the code to be read in accordance with its intended purpose. However, this produces a distorted design and a design large in construction again in the field of view.

It is therefore the object of the invention to produce suitable illumination in a simple and flexible manner.

This object is satisfied by a camera and by a method of detecting image data from a detection zone in accordance with the respective independent claim. The camera records image data from the detection zone using an image sensor. An illumination unit having at least one light source illuminates the detection zone for this purpose. A front screen terminates the camera or its housing at the front side, that is in the direction of view of the camera, and thereby in particular protects the illumination unit.

The invention starts from the basic idea that the light source does not irradiate directly into the detection zone, but that its light is rather previously incident on a lateral deflection element associated with the light source. Laterally here means an offset in the plane perpendicular to the field of vision that is in turn fixed, for example, by the optical axis of the image sensor or of a reception optics disposed in front of the image sensor. The light generated by the light source is remitted non-directionally at the deflection element for a diffuse illumination or is reflected directionally for a dark field illumination. The deflection element accordingly has a remitting or reflective surface depending on the illumination to be generated. The deflection element and the light source are located beneath the front screen, that is within the camera and protected by the front screen. At least parts of the deflection element can here also be formed together with the front screen that then combines the protective function and the deflection function.

The invention has the advantage that a modular dark field illumination or a diffuse illumination is integrated in a camera. The camera can thereby be adapted very much more simply to an actually required illumination situation. The design of the camera enables compact and in particular flat construction sizes.

The light source is preferably aligned with an irradiation direction transversely to the field of vision of the camera. For this purpose, laterally irradiating LEDs can preferably be used. As already mentioned, the field of vision of the camera can be defined via the optical axis of the image sensor or of a reception optics. The lateral deflection element is arranged in the direction of irradiation so that the transmitted light of the light source is incident there. A direction of irradiation transversely to the field of vision signifies angles of at least 70°, at least 80°, and preferably at approximately 90°. Even somewhat larger angles are conceivable; the deflection element then accordingly guides the light initially transmitted with a small reverse component into the detection zone. A direction of irradiation transversely to the field of vision means that the illumination in the ideal case does not need any more construction depth than the deflection element itself since the deflection practically takes place in one plane. An extremely flat manner of construction of the illumination unit is therefore possible.

The light source is preferably arranged with a direction of irradiation toward the outside. The direction of irradiation here has at least one component radially outwardly with respect to the field of vision. Outwardly does not have to mean directly in extension of the connection between the light source and the optical center of the reception optics, for example if a plurality of light source are arranged to form a rectangle and are outwardly directed with respect to its edges. A larger surface is produced by the direction of irradiation to the outside with a subsequent deflection, said surface in particular being larger than the surface which is formed by a plurality of light sources themselves and from which the light is effectively irradiated. This in turn enables shallow angles of illumination at a greater distance; the existing construction size is thus better utilized by the orientation of the light source to the outside.

The deflection element is preferably arranged outwardly beneath a margin of the front screen. The deflection thus takes place only at the outermost margin and thus at the largest possible distance from the reception optics. The existing surface is thus even optimally used because the margin of the front side of the camera practically becomes the effective illumination source.

The deflection element is preferably configured as a frame. This frame surrounds the preferably plurality of light source that are each aligned toward the frame. Such a frame can be very simply integrated into a flat device design and so-to-say forms the plane of the light deflection within the camera.

The front screen and the frame are preferably rectangular. The frame is directly adapted to the shape of the front screen. This can be produced simply and also produces a simple overall design.

The deflection element is preferably subsequently replaceable, in particular as an exchangeable frame to change between a diffuse illumination and a dark field illumination and/or to change illumination parameters by a different shape of the deflection element. A suitable deflection element is used in the respective camera or even application as required. A change is made here between a dull, diffusely remitting surface and a reflective surface to obtain a diffuse illumination or a dark field illumination. In addition a deflection element having a different mirror shape can be used to set a different angle of illumination, reading distance or another illumination parameter adaptable by beam shaping and by the beam direction. The deflection element is preferably an exchangeable frame, again preferably in rectangular form. This can be produced and replaced particularly simply.

The deflection element is preferably connected to the front screen and is thus formed replaceably together with the front screen. This further facilitates the change of the illumination. Only the front screen together with the deflection element has to be removed and replaced with another front screen having a different deflection element.

The deflection element preferably has an optically effective contour, in particular a concave contour or a free-form surface. The illumination is thereby directly adapted even better to the required illumination conditions with respect to a simple deflection by flat mirrors.

A plurality of light sources, in particular all of the light sources, of the illumination unit are preferably arranged on a common circuit board. This is possible because the deflection element provides a matching illumination angle. The light sources themselves can be arranged flatly next to one another, they do not themselves have to be at the correct angle to the detection zone. A common circuit board reduces the complexity of the illumination unit itself and of its installation and thus reduces the manufacturing costs.

The illumination unit preferably has a plurality of individually controllable groups of light sources. Each of the groups of preferably equal size comprises at least one light source. By a direct activation or intensity adaptation of the groups, different light scenarios are created that can be predefined by parameters, but can also be set or taught by feedback of an evaluation of the image data. Four groups are preferably provided per edge of a deflection element formed as a rectangular frame. The illumination then becomes changeable from all four directions by an individual control of the groups.

The illumination unit preferably has light sources of different colors. Some structures, in particular codes of specific colors on a specific background, can be read better in a matching illumination spectrum. This can be achieved by setting a color for the light sources, but also by mixing colors. Depending on the embodiment, light sources of different colors or light sources whose color can be switched such as multicolor LEDs can be provided.

The camera preferably has a control and evaluation unit that is configured to identify code regions in the image data and to read their code content. The camera thus becomes a camera-based code reader for barcodes and/or 2D codes according to various standards, optionally also for text recognition (optical character recognition, OCR). A control and evaluation unit is preferably provided in another respect without a code reading function that controls and performs the various tasks in the camera such as the image recording, an illumination, the measurement of actual and required focal position and its display.

The method in accordance with the invention can be further developed in a similar manner and shows similar advantages in so doing. Such advantageous features are described in an exemplary, but not exclusive manner in the subordinate claims dependent on the independent claims.

Figure 2:
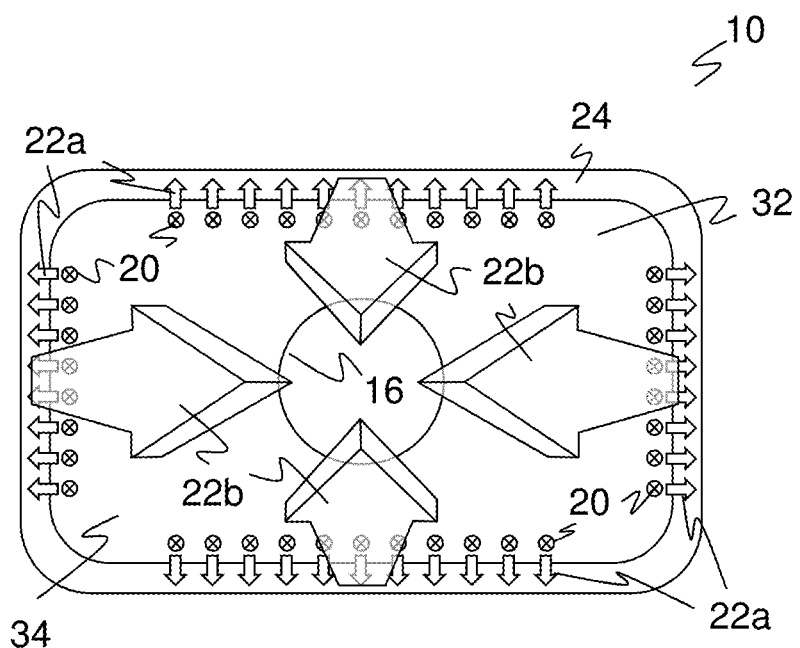
Figure 3:
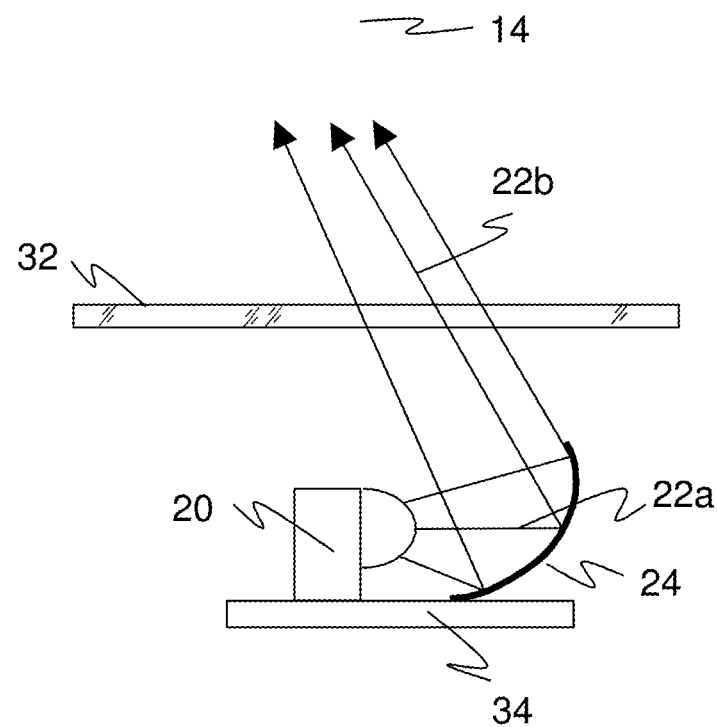
Figure 4:
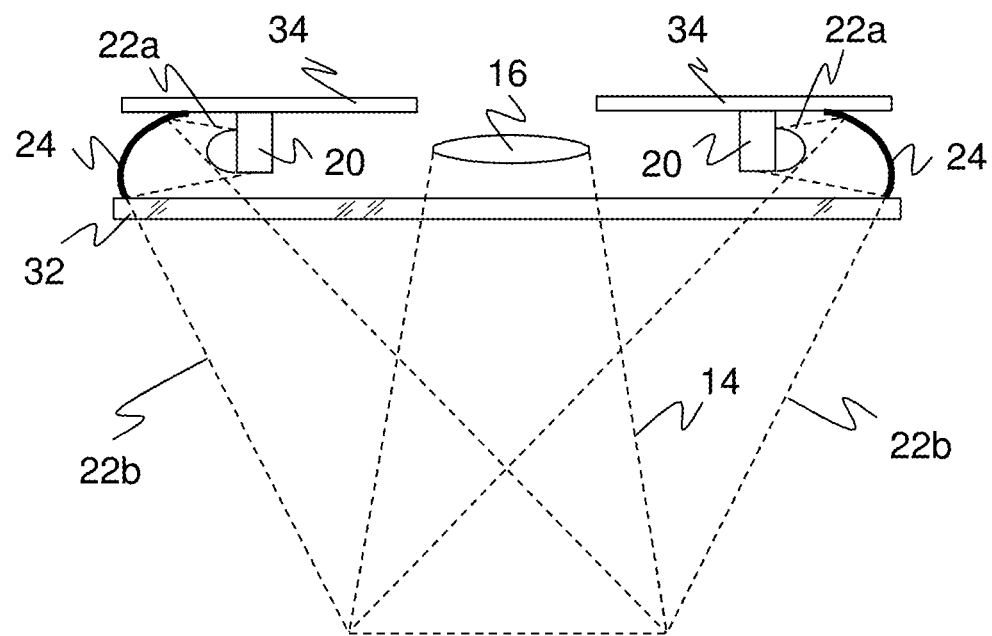
Figure 5:
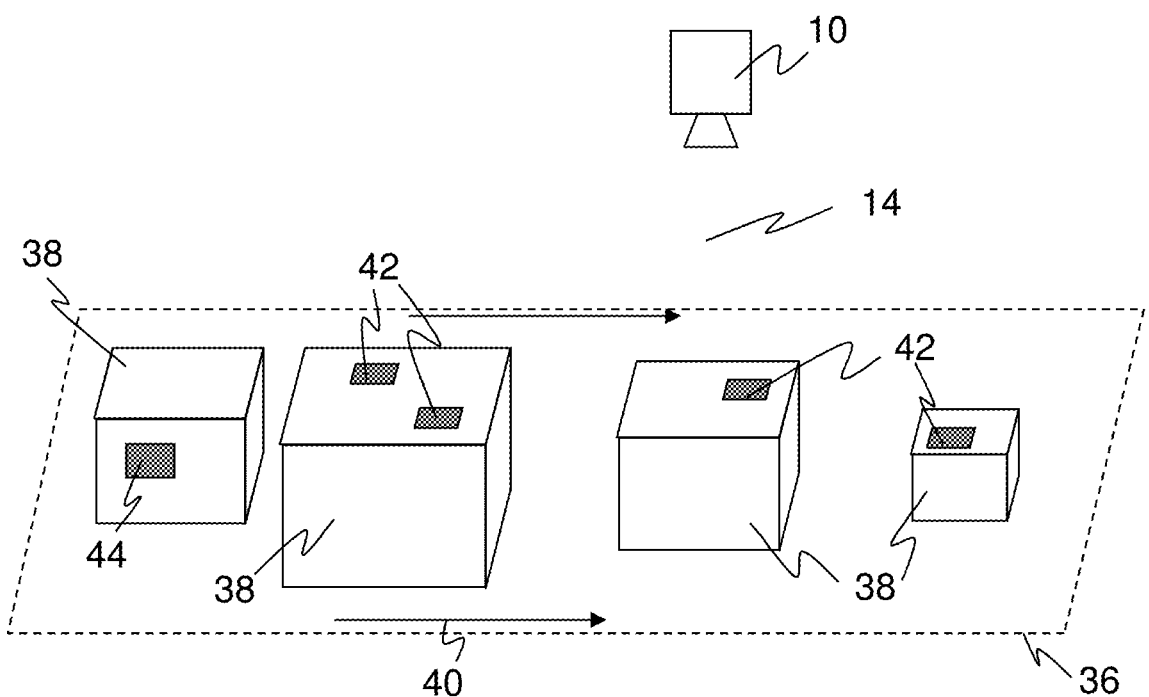

The invention will be explained in more detail in the following also with respect to further features and advantages by way of example with reference to embodiments and to the enclosed drawing. The Figures of the drawing show in:

FIG. 1 a schematic sectional representation of a camera with illumination;

FIG. 2 a frontal view of the camera;

FIG. 3 a detailed view of the deflection of the illumination;

FIG. 4 a schematic representation of the illumination produced by deflection and of the field of vision of the camera; and FIG. 5 a three-dimensional view of an exemplary use of the camera in an installation at a conveyor belt.

FIG. 1 shows a schematic sectional representation of a camera 10. Received light 12 from a detection zone 14 is incident on a reception optics 16 that conducts the received light 12 to an image sensor 18. The optical elements of the reception optics 16 are preferably configured as an objective composed of a plurality of lenses and other optical elements such as diaphragms, prisms, and the like, but here only represented by a lens for reasons of simplicity.

To illuminate the detection zone 14 during a recording of the camera 10, the camera 10 comprises an illumination unit that is shown in FIG. 1 in the form of two light sources 20, for example LEDs or also laser diodes. A transmission optics, not shown, can be associated with the light sources 20.

The light sources 20 do not irradiate directly into the detection zone 14. Their transmitted light 22a is instead first aligned on a lateral deflection element 24. The deflection element 24 has, depending on the application of the camera 10, a reflective or diffuse surface that generates a dark field illumination 22b with a shallow angle of irradiation into the detection zone 14 or a diffuse illumination 22b from the transmitted light 22a. The deflection element 24 and the optical path of the transmitted light 22a-b will be explained in more detail below with reference to FIGS. 2 to 4.

A control and evaluation unit 26 is connected to the illumination unit and to the image sensor and is responsible for the control work, the evaluation work, and for other coordination work in the camera 10. It therefore reads image data of the image sensor 18 to process them and to output them at an interface 28. Separate evaluations of the image data are also conceivable, in particular the decoding of code regions in the image data so that the camera 10 becomes a camera-based code reader.

The camera 10 is protected by a housing 30 that is terminated by a front screen 32 in the front region where the received light 12 is incident and the transmitted light 22b emerges.

FIG. 2 shows an embodiment of a camera 10 in a frontal view. The front of the camera 10 and its front screen 32 are rectangular, with rounded corners indicating that this shape is not to be understood in a narrow mathematical sense. A respective plurality of light sources 20 of the illumination unit 20 are arranged at the edges of the rectangle, but in contrast, depending on the embodiment, more or less inwardly displaced depending on the embodiment. The light sources 20 are preferably accommodated on a common circuit board 34.

The deflection element 24 is configured as a reflective frame that is likewise substantially rectangular, that surround the light sources 20, and that preferably forms the outer margin of the front of the camera 10 to utilize the available surface as completely as possible. The light sources 20 transmit their transmitted light 22a outwardly in the direction toward the deflection element 24 or the reflective frame. The transmitted light 22a is deflected diffusely or directionally into the detection zone 14 there depending on the embodiment of the deflection element 24. The corresponding diffuse illumination 22b or dark field illumination 22b emerges from the plane of the paper into the detection zone 14 in the frontal view of FIG. 2 with a shallow angle of incidence. With a diffuse illumination 22b, unlike with a directed dark field illumination 22b, the direction can naturally only be specified for a central portion.

The light sources 20 are preferably individually controllable and thereby enable variable illumination zones. To reduce the circuit complexity, it can be sufficient only to control groups of light sources 20 together. One variant here is to combine the light sources 20 arranged at a respective edge of the rectangle to form a respective group. An illumination 22b from specific directions can then be directly generated, in particular in an interplay with an image processing of the image data of the image sensor 18 in the control and evaluation unit 26, in order in this manner to find the best possible lighting setting for the respective application.

In a further preferred embodiment, multi-color light sources 20 are used. The plurality of colors can already be generated in a respective light source 20 as with a multi-color LED, or light sources 20 of different colors are used next to one another that are selectively activated for specific colors. Some structures become more easily recognizable due to a color change of the illumination 22b; for instance codes are read better in a red or in a blue light depending on the print color and the background. A reflective deflection element 24 does not generate any chromatic aberration in this process.

FIG. 3 shows a detailed structure with the optical path of transmitted light 22a and illumination 22b at the deflection element 24 in a cross-section. The light source 20 is here an LED having lateral light emergence, accordingly perpendicular to the field of vision of the camera 10. The direction of irradiation is preferably at least transverse to the field of vision, i.e. an angular range different from the orthogonal alignment of, for example, 70°-110° is also conceivable. This can also be achieved, for example, with a light deflection at the light source 20 instead of by a laterally irradiating LED.

The deflection element 24 designed with a reflective surface in FIG. 3 directs the transmitted light 22a in the direction of the detection zone 14. In this respect, the entry angle in the detection zone 14 can also be shallower or steeper than shown by a corresponding configuration of the deflection element 24 depending on the distance and the shape in which a dark field illumination 22b is required.

The contour of the deflection element 24 is configured such that as much transmitted light 22 as possible is directed into the detection zone 14. In the example shown, a concave contour, that is a bundled contour, is selected. Parameters of the dark field illumination 22b such as the working distance, the angle of irradiation, the size and the geometry of the detection zone 14, or the intensity distribution can be set via the curvature and the effective tilt angle of the contour. The contour can also be configured as free-form for this purpose.

Such optical effects can also be achieved instead of with a specific contour of the deflection element 24 or cooperating therewith by means of additional optical components, not shown, between the light source 20 and the deflection element 24 that, for instance, focus the transmitted light 22a in the vertical direction of FIG. 3 and thus allow it to be incident on the deflection element 24 in bundled form. The front screen 32 can furthermore be provided with an optically functional structure, for instance an impressed lens, a prism, or a diffractive structure that provides a further bundling or an additional change of the angle of irradiation in the detection zone 14.

It is selectively possible to replace the deflection element 24 having a reflective surface with one having a diffusely scattering surface. A dark field illumination 22b is then not produced, but rather a diffuse illumination 22b.

The camera 10 supports a change between a dark field illumination 22b and a diffuse illumination 22b and/or an adaptation of the illumination parameters by a very simple conversion in which the deflection element 24 is replaced with a deflection element 24 matching the new demands. The deflection element 24 is only releasably fixed in the camera 10 for this purpose. In the case of a deflection element 24 configured as a frame, as was presented in FIG. 2, it is an exchangeable frame that is inserted between the front screen 32 and the remaining housing 30. In a particularly preferred embodiment, the deflection element 24 or the exchangeable frame is fastened to the front screen 32 and thus forms a common component. A change of the deflection element 24 and then consequently a change between a dark field illumination 22b and a diffuse illumination 22b or an adaptation of illumination parameters is very simply effected by replacing the front screen 32.

FIG. 4 again shows a sectional view of the front region of the camera 10 to illustrate the detection zone 14 and the region illuminated by a dark field illumination 22b here. A lateral angle of incidence is achieved even though the light sources 20 themselves are mounted in one plane. The gap between the sections of the circuit board 34 shown is due to the sectional view; it can nevertheless be the same circuit board 34 having a central opening for the received light 12, as can be recognized in the frontal view of FIG. 2.

FIG. 5 shows a possible use of the camera 10 in installation at a conveyor belt 36 that conveys objects 38, as indicated by the arrow 40, through the detection zone 14 of the camera 10. The objects 38 can bear code regions 42 at their outer surfaces. It is the object of the camera 10 to detect properties of the objects 38 and, in a preferred use as a code reader, to recognize the code regions 42, to read and decode the codes affixed there, and to associate them with the respective associated object 38. In order also to recognize laterally applied code regions 44, additional cameras 10, not shown, are preferably used from different perspectives.

The invention claimed is:

1. A camera comprising:
an image sensor for detecting image data from a detection zone;
an illumination unit having at least one light source for illuminating the detection zone;
a front screen; and
a lateral deflection element associated with the at least one light source, the lateral deflection element being arranged in the camera such that the lateral deflection element is protected by the front screen, the lateral deflection element having a diffusely scattering surface or a reflective surface to generate a diffuse illumination or a dark field illumination in the detection zone, the lateral deflection element being replaceable to switch between the diffusely scattering surface to generate the diffuse illumination and the reflective surface to generate the dark field illumination.

2. The camera in accordance with claim 1,
wherein the at least one light source is aligned with a direction of irradiation transverse to a field of vision of the camera.

3. The camera in accordance with claim 2,
wherein the at least one light source is aligned with a direction of irradiation perpendicular to the field of vision of the camera.

4. The camera in accordance with claim 1,
wherein the at least one light source is arranged with a direction of irradiation toward the outside.

5. The camera in accordance with claim 1,
wherein the lateral deflection element is arranged outwardly beneath a margin of the front screen.

6. The camera in accordance with claim 1,
wherein the lateral deflection element is configured as a frame.

7. The camera in accordance with claim 6,
wherein the front screen and the frame are rectangular.

8. The camera in accordance with claim 1,
wherein the lateral deflection element is configured as an exchangeable frame.

9. The camera in accordance with claim 1,
wherein the lateral deflection element is connected to the front screen and is thus configured as replaceable together with the front screen.

10. The camera in accordance with claim 1,
wherein the lateral deflection element has an optically effective contour.

11. The camera in accordance with claim 10,
wherein the optically effective contour is one of a concave contour and a free-form surface.

12. The camera in accordance with claim 1,
wherein a plurality of light sources of the illumination unit are arranged on a common circuit board.

13. The camera in accordance with claim 1,
wherein the illumination unit comprises a plurality of controllable groups of light sources and/or light sources of different colors.

14. The camera in accordance with claim 1, further comprising
a control and evaluation unit that is configured to identify code regions in the image data and to read code content from the code regions.

15. A method of detecting image data from a detection zone, comprising the steps of:
selecting a replaceable lateral deflection element with either a diffusely scattering surface or a reflective surface to selectively respectively generate diffuse illumination or dark field illumination; and
illuminating the detection zone through a front screen by an illumination unit having at least one light source, wherein the detection zone is illuminated through the replaceable with lateral deflection element, the replaceable lateral deflection element being protected by the front screen and being associated with the at least one light source.

16. A camera comprising:

an image sensor for detecting image data from a detection zone;

an illumination unit having at least one light source for illuminating the detection zone;

a front screen; and a lateral deflection element associated with the at least one light source, the lateral deflection element being arranged in the camera such that the lateral deflection element is protected by the front screen, the lateral deflection element having a shape associated therewith, the lateral deflection element being replaceable to switch the shape thereof in order to switch illumination parameters associated therewith.

* * * * *